(12) United States Patent
Sands

(10) Patent No.: US 7,430,957 B2
(45) Date of Patent: Oct. 7, 2008

(54) BLENDER AND JUICER SYSTEM

(75) Inventor: Lenny Sands, Encino, CA (US)

(73) Assignee: Homeland Housewares, LLC, Los Angeles, CA (US)

( * ) Notice: Subject to any disclaimer, the term of this patent is extended or adjusted under 35 U.S.C. 154(b) by 576 days.

(21) Appl. No.: 10/988,281

(22) Filed: Nov. 13, 2004

(65) Prior Publication Data

US 2005/0068847 A1    Mar. 31, 2005

Related U.S. Application Data

(63) Continuation-in-part of application No. 10/649,757, filed on Aug. 26, 2003, now Pat. No. 6,817,750.

(51) Int. Cl.
*A47J 43/046* (2006.01)
*A47J 43/06* (2006.01)

(52) U.S. Cl. .................. 99/513; 366/205; 366/206

(58) Field of Classification Search .......... 99/495, 99/510, 513; 241/282.2, 282.1, 199.12, 37.5; 366/205, 206, 197

See application file for complete search history.

(56) References Cited

U.S. PATENT DOCUMENTS

| | | | |
|---|---|---|---|
| 1,480,914 A | 1/1924 | Poplawski | 366/314 |
| 2,299,730 A | 10/1942 | Bornstein | 65/131 |
| 2,304,476 A | 12/1942 | Poplawski | 241/282.2 |
| 2,530,455 A | 11/1950 | Forss | 259/108 |
| RE24,607 E | 2/1959 | Seyfried | 192/55.2 |
| 3,064,949 A | 11/1962 | Dewenter | 259/108 |
| 3,085,710 A | 4/1963 | McIlroy | 220/90.4 |
| 3,315,946 A | 4/1967 | Nissman | 259/108 |
| 3,346,029 A | 10/1967 | Harris | |
| 3,417,972 A | 12/1968 | Vincent | |
| 3,612,126 A | 10/1971 | Emmons et al. | 241/199.12 |
| 3,704,864 A | 12/1972 | Lee | 277/212 |
| 3,881,705 A | 5/1975 | Greenspan | 259/108 |
| 3,895,548 A | 7/1975 | Sauve | |
| 3,970,258 A | 7/1976 | Mantelet | 241/282.1 |
| 4,111,372 A | 9/1978 | Hicks et al. | 241/37.5 |
| 4,345,517 A | 8/1982 | Arao et al. | |
| 4,397,427 A | 8/1983 | Howard | |
| 4,480,926 A | 11/1984 | Lattery, Jr. et al. | 366/251 |
| 4,487,509 A | 12/1984 | Boyce | 366/199 |
| 4,542,857 A | 9/1985 | Akasaka | |
| D281,945 S | 12/1985 | Boyce | D7/378 |

(Continued)

FOREIGN PATENT DOCUMENTS

DE    19602147 A1    7/1997

(Continued)

*Primary Examiner*—Reginald L Alexander
(74) *Attorney, Agent, or Firm*—Cislo & Thomas, LLP

(57) ABSTRACT

A blender and juicer system comprises a blender container having an open top and an open bottom, and a removable juicer member being open at each end and adapted for insertion into the blender container. The blender container is adapted to prevent the over-insertion of the removable juicer member. The inserted juicer member is adapted to engage operatively the interior of the blender container. The blender and juicer system also comprises a plunger adapted for insertion into the juicer member. The inserted plunger is utilized during a juice extraction operation. The plunger includes a top exterior lip which defines the optimal range of plunger insertion into the juicer member.

1 Claim, 10 Drawing Sheets

U.S. PATENT DOCUMENTS

| | | | |
|---|---|---|---|
| 4,561,782 A | 12/1985 | Jacobsen et al. | |
| 4,708,487 A | 11/1987 | Marshall | 366/206 |
| 4,714,203 A | 12/1987 | Williams | 241/36 |
| 4,723,719 A | 2/1988 | Williams | 241/282.2 |
| 4,889,248 A | 12/1989 | Bennett | 215/390 |
| 5,302,021 A | 4/1994 | Jennett et al. | |
| 5,355,784 A | 10/1994 | Franklin et al. | |
| 5,479,851 A | 1/1996 | McClean et al. | |
| 5,636,923 A * | 6/1997 | Nejat-Bina | 366/205 |
| 5,639,161 A | 6/1997 | Sirianni | 366/314 |
| 5,662,032 A | 9/1997 | Baratta | 99/513 |
| 5,690,021 A | 11/1997 | Grey | 99/513 |
| 5,720,552 A | 2/1998 | Schinglegger | 366/197 |
| 5,882,113 A | 3/1999 | Binder | 366/146 |
| 5,911,504 A | 6/1999 | Schindlegger, Jr. | 366/197 |
| 6,065,861 A | 5/2000 | Chen | 366/144 |
| 6,135,019 A | 10/2000 | Chou | 99/513 |
| 6,223,652 B1 * | 5/2001 | Calia et al. | 99/513 |
| D470,050 S | 2/2003 | Renz et al. | D9/434 |
| D487,668 S | 3/2004 | Sands | D7/378 |
| 6,758,592 B2 | 7/2004 | Wulf et al. | 215/228 |
| 7,040,799 B2 * | 5/2006 | Pryor, Jr. | 366/199 |
| 2001/0036124 A1 | 11/2001 | Rubenstein | 366/205 |
| 2002/0012288 A1 | 1/2002 | Masip et al. | 366/205 |
| 2003/0213373 A1 | 11/2003 | Dickson, Jr. | 99/348 |
| 2003/0214875 A1 | 11/2003 | Dickson, Jr. | 366/206 |

FOREIGN PATENT DOCUMENTS

| | | |
|---|---|---|
| EP | 0562310 A1 | 9/1993 |
| JP | 5-199944 | 8/1993 |
| JP | 6-319656 | 11/1994 |
| JP | 9-65988 | 3/1997 |
| JP | 10-117944 | 5/1998 |
| JP | 11-137454 | 5/1999 |
| JP | 2000-201837 | 7/2000 |
| JP | 2000-201838 | 7/2000 |
| JP | 2002-336139 | 11/2002 |
| JP | 2004-16693 | 1/2004 |
| JP | 2002-177155 | 6/2004 |
| JP | 2003-259995 | 9/2004 |
| JP | 2002-291627 | 10/2004 |
| KR | 10-0263732 | 5/2000 |
| KR | 20-0202865 | 8/2000 |
| KR | 10-0323245 | 1/2002 |
| WO | 2003/003888 A1 | 1/2004 |
| WO | 2003/005871 A1 | 1/2004 |
| WO | 2003/075726 A1 | 9/2004 |

* cited by examiner

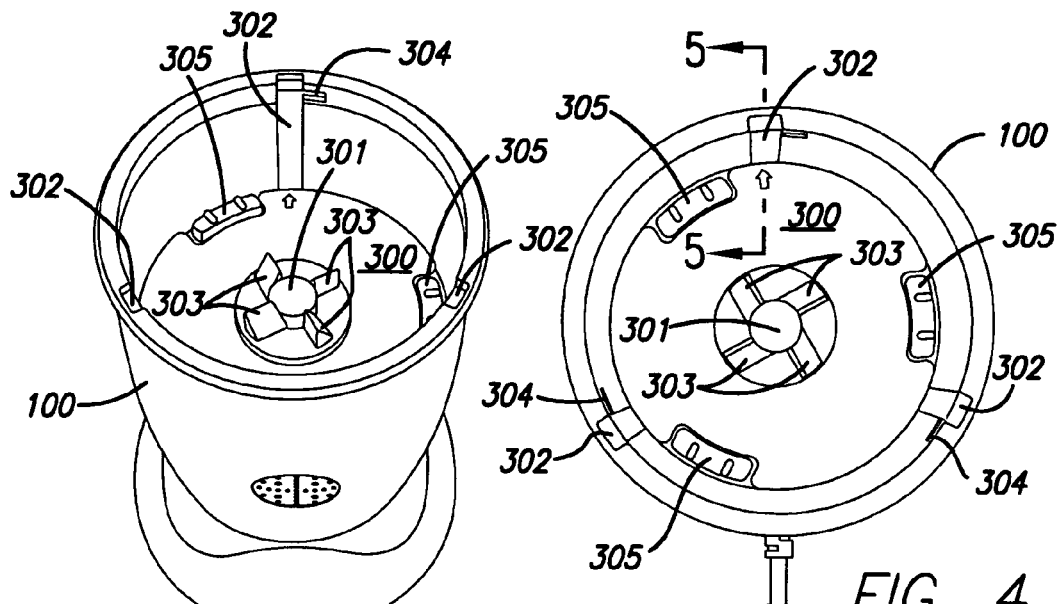
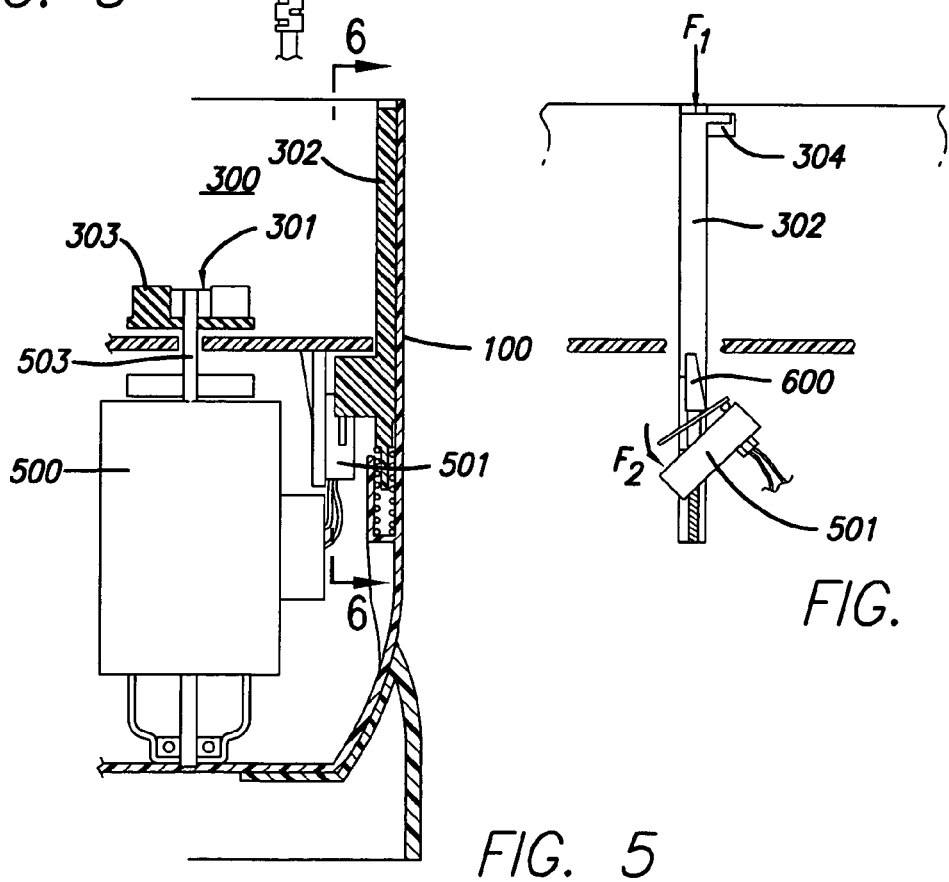

BLENDER AND JUICER SYSTEM

CROSS-REFERENCE TO RELATED APPLICATIONS

This document is a continuation-in-part application relating to, and claiming priority of, U.S. patent application Ser. No. 10/649,757, filed on Aug. 26, 2003, entitled "Individualized Blender," and now issued as U.S. Pat. No. 6,817,750 on Nov. 16, 2004, the subject matter of which is incorporated herein in its entirety by reference.

BACKGROUND

Various devices for blending various liquids and solids have been developed over the years. These devices have various features and options to suit a wide variety of uses and applications. For example, there are many blenders that are either handheld or freestanding devices. While these devices have been useful, these prior art devices can be difficult to clean, use and store unused products, especially, when preparing smaller batches. More specifically, freestanding devices can be too large and cumbersome to use to make smaller portions and are generally better designed for blending larger quantities of fluids and ingredients. Handheld units may be useful to make individualized portions, but they may lack the power to properly blend ingredients together. Furthermore, these handheld units are generally used with open containers such as bowls or cups that can increase the chances of spilling or splattering during preparation of the ingredients. Moreover, the unused portion would have to be poured out of the open container and into a sealable container to be stored or to be readily carried by a person. Accordingly, there remains a need for a blender and juicer system that is easier to use, clean and store unused products.

SUMMARY OF THE INVENTION

Exemplary embodiments disclosed herein are generally directed to a blender and juicer system.

In accordance with one aspect of the invention, the blender and juicer system comprises a blender container having an open top and an open bottom, and a removable juicer member being open at each end and adapted for insertion into the blender container. The blender container is adapted to prevent the over-insertion of the juicer member. The inserted juicer member is adapted to engage operatively the interior of the blender container. The blender and juicer system also comprises a plunger adapted for insertion into the juicer member. The inserted plunger is utilized during a juice extraction operation. The blender and juicer system further comprises means for defining the optimal range of plunger insertion into the removable juicer member.

These and other aspects of the invention will become apparent from a review of the accompanying drawings and the following detailed description of the invention.

BRIEF DESCRIPTION OF THE DRAWINGS

The invention is generally shown by way of reference to the accompanying drawings in which:

FIG. 3 is a perspective view of a blender base for use as part of the blender and juicer system of FIG. 1;

FIG. 4 is a top plan view of FIG. 3;

FIG. 5 is a cross-sectional view taken along section line 5-5 of FIG. 4;

FIG. 6 is a cross-sectional view taken along section line 6-6 of FIG. 5;

DETAILED DESCRIPTION

The detailed description set forth below in connection with the appended drawings is intended as a description of exemplary embodiments and is not intended to represent the only forms in which the exemplary embodiments may be constructed and/or utilized. The description sets forth the functions and the sequence of steps for constructing and operating the exemplary embodiments in connection with the illustrated embodiments. However, it is to be understood that the same or equivalent functions and sequences may be accomplished by different embodiments that are also intended to be encompassed within the spirit and scope of the invention.

Some embodiments of the invention will be described in detail with reference to the related drawings of FIGS. 1-17. Additional embodiments, features and/or advantages of the invention will become apparent from the ensuing description or may be learned by practicing the invention. In the figures, the drawings are not to scale with like numerals referring to like features throughout both the drawings and the description.

Figure 1:
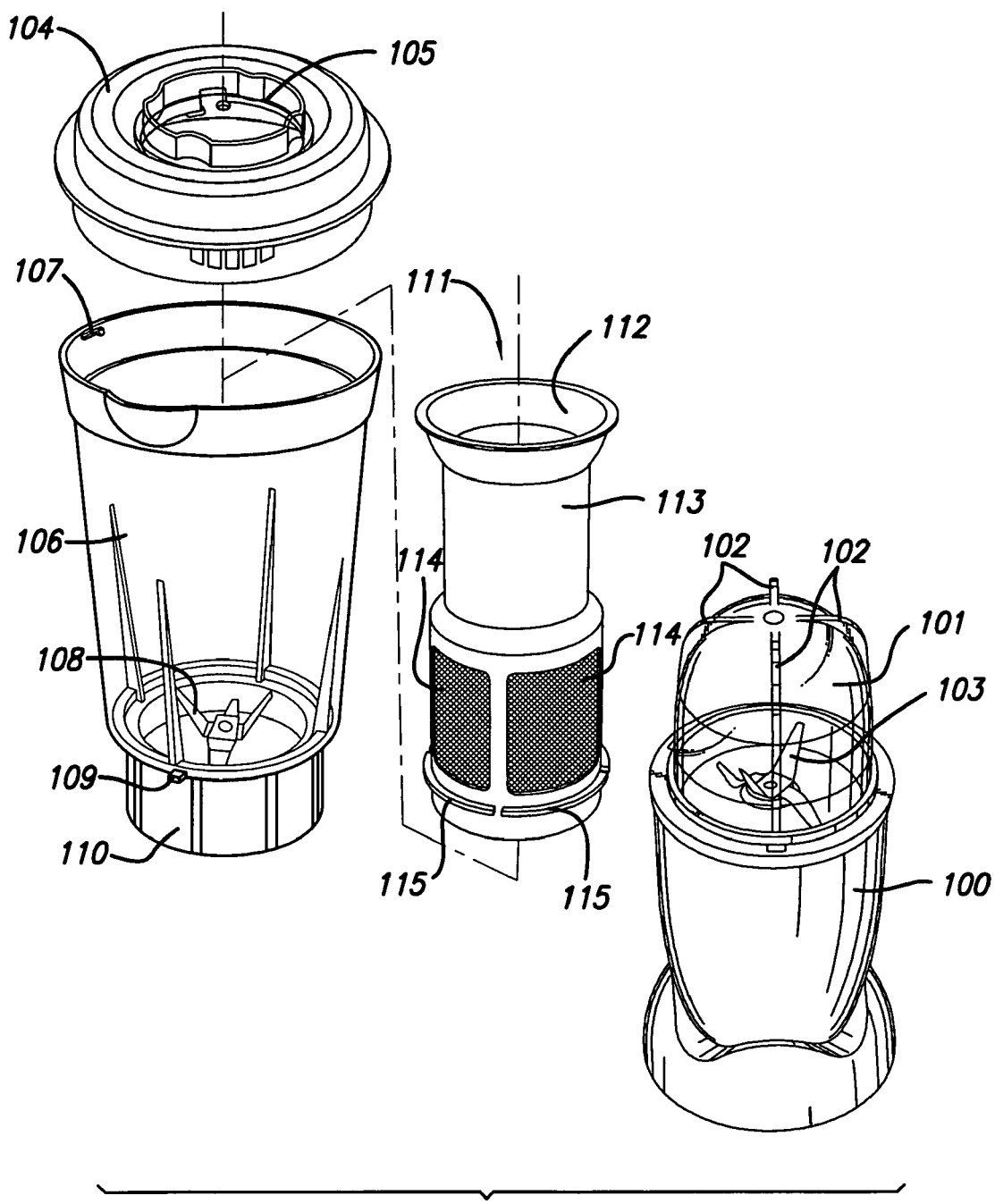
FIG. 1 is a perspective view of a blender and juicer system in accordance with an exemplary embodiment of the present invention.

Turning to the drawings, FIG. 1 generally depicts a blender and juicer system comprising a generally bullet-shaped container 101 operatively coupled to a blender base 100, a juicer member 111 being open at each end, and a blender container 106 adapted to receive juicer member 111. Bullet-shaped container 101 includes a plurality of generally arcuate ridges 102 provided symmetrically on its outer surface, as generally illustrated in reference to FIGS. 1-2D. For purposes of this application, the term "blender" is generally defined as a device having whirling blades for chopping, mixing, or liquefying foods.

Blender container 106 has an open top and an open bottom. Blender container 106 includes selectively removable lid members 104, 105 (FIG. 1). Lid member 104 may be partially open to provide access to the interior of blender container 106. Lid member 105 may be coupled to lid member 104 to cut off access to the interior of blender container 106. Lid member 104 may be locked on to the open top of blender container 106 via a cap-locking member 107. Cap-locking member 107 may be implemented, for example, as a generally L-shaped ridge disposed at the lip of blender container 106 (FIG. 1). Cap-locking member 107 engages a corresponding locking member (not shown) on lid member 104 to securely lock the same to blender container 106. Other suitable lid configurations may be utilized, as needed, such as a one-piece or a multi-piece lid cap and/or the like.

The open bottom of blender container 106 may be coupled to a removable base portion 110 (FIG. 1) incorporating a blade member 108 (FIG. 1) adapted to agitate the contents of the container. Blade member 108 is operatively coupled to an impeller powered by a blender motor of the type generally shown in FIG. 5. Blade member 108 may include one, two, three, four or more cutting elements, as needed. The cutting elements may be generally flat members with sharpened edges, pointed tips, and one or more bends along the surface of the cutting elements.

Removable base portion 110 may be affixed to the bottom of blender container 106 via thread-fit, friction fit, snap-fit or any other suitable type of attachment. The open bottom of blender container 106 is provided with a plurality of lateral (exterior) locking members 109, as generally shown in FIGS. 1, 7, 11-12. Locking members 109 are adapted to operatively lock blender container 106 to a blender base of the type generally shown in FIGS. 3-6.

Figure 2A:
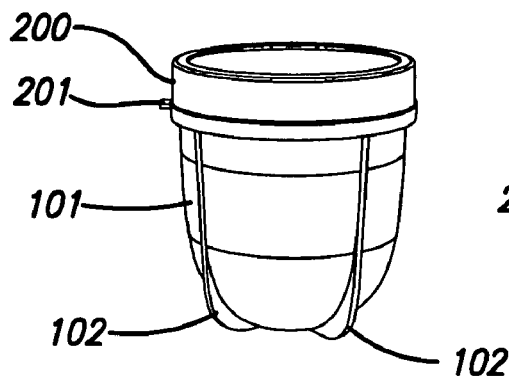
FIG. 2A is a perspective view of a container for use as part of the blender and juicer system of FIG. 1.

FIGS. 2A-2D generally illustrate various configurations of bullet-shaped container 101 which may be adapted for small or large servings to be prepared/consumed by one and/or a few individuals. FIG. 2A generally shows bullet-shaped container 101 resting on external ridges 102 allowing users convenient access to its interior. For example, container 101 may be used as a drinking vessel. External ridges 102 are generally shaped to permit container 101 to rest on its apex without tipping over. The number of external ridges may be varied, as needed, as long as container 101 can stand upright on a substantially flat surface.

Figure 2B:
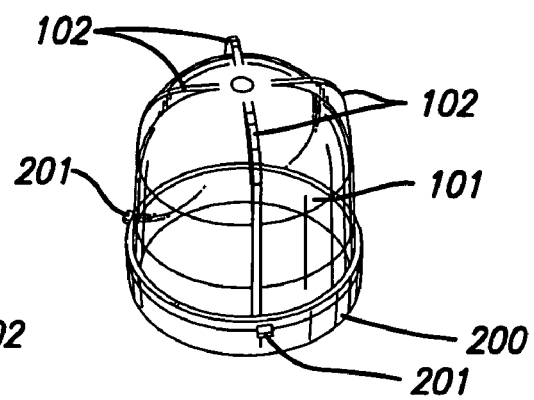
FIG. 2B is an inverted perspective view of the container of FIG. 2A.
Figure 2C:
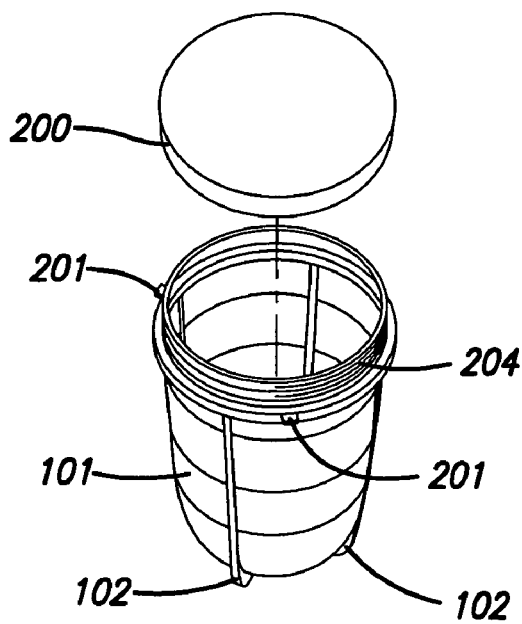
FIG. 2C is an exploded perspective view of the container of FIG. 2A.

In another example, the user may blend the contents of bullet-shaped container 101, detach container 101 from blender base 100, access the contents of container 101 with the container standing upright (FIG. 2A) on a flat surface, and store the contents for later use using a cap 200 (FIGS. 2A-2C). Cap 200 may be affixed to the opening of container 101 via threads 204 (FIG. 2C). Cap 200 may also be affixed to container 101 via friction fit, snap-fit or other suitable type of attachment. Once cap 200 is affixed, container 101 may be inverted to rest on cap 200, as generally depicted in FIG. 2B.

Figure 2D:
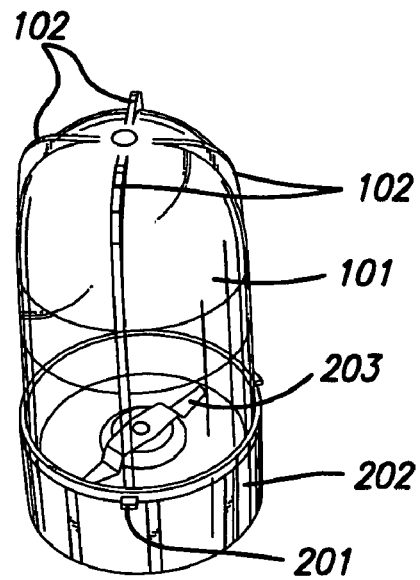
FIG. 2D is a perspective view of another container for use as part of the blender and juicer system of FIG. 1.

In an alternate configuration, container 101 may be adapted to hold a relatively larger volume. Container 101 may include a removable base 202 having a blade member 203, as generally shown in FIG. 2D. Moreover, as generally shown in FIGS. 2A-2D, container 101 may be provided with locking members 201 that are spaced about the periphery of container 101. Locking members 201 allow the user to operate the blender without requiring a constant application of force to container 101 (in order to keep the motor switched on).

Blender base 100 includes a recessed well 300, as generally depicted in reference to FIGS. 3-4. Blender base 100 also includes a motor 500 (FIG. 5) that is operatively coupled to an impeller 301 (FIG. 3). Impeller 301 comprises a plurality of symmetrically disposed blades 303 radiating from the center of impeller 301. A plurality of bushings 305 (FIGS. 3-4) may be utilized about the periphery of recessed well 300. Alternatively, blender base 100 may be adapted for use without utilization of bushings 305. Bushings 305 may be made from a generally resilient material such as, but not limited to, rubber, silicone or the like to reduce vibrations during agitation of the container contents.

Recessed well 300 is provided with a plurality of pressure-activated switches 302 (FIGS. 3-4). Removable base 110 is adapted to fit within recessed well 300 and couple operatively to impeller 301. In use, the weight of bullet-shaped container 101 or blender container 106 causes the downward movement of switches 302 thereby activating the motor. As generally shown in FIG. 3, a locking groove 304 may be provided adjacent to switch 302. Accordingly, in use, when locking members 201 (FIGS. 2A-2C) contact and depress respective switches 302, bullet-shaped container 101 or blender container 106 may be rotated by the user to allow locking members 201 to engage respective locking grooves 304.

As generally depicted in FIG. 6, when a force $F_1$ is applied to switch 302, switch 302 moves downward, i.e. in the direction of the applied force. This downward movement causes a cam 600 on switch 302 to contact a motor power switch 501 thereby powering blender motor 500 (FIG. 5). Accordingly, depending on the intended use or application, bullet-shaped container 101 or blender container 106 may be depressed to activate motor 500 (FIG. 5) for relatively short periods of time. Alternatively, bullet-shaped container 101 or blender container 106 may be depressed and rotated slightly to allow locking members 201 to engage respective locking grooves 304 thereby permitting continuous operation of motor 500, i.e. without requiring the user to exert constant pressure on the container to keep the motor running.

Figure 10:
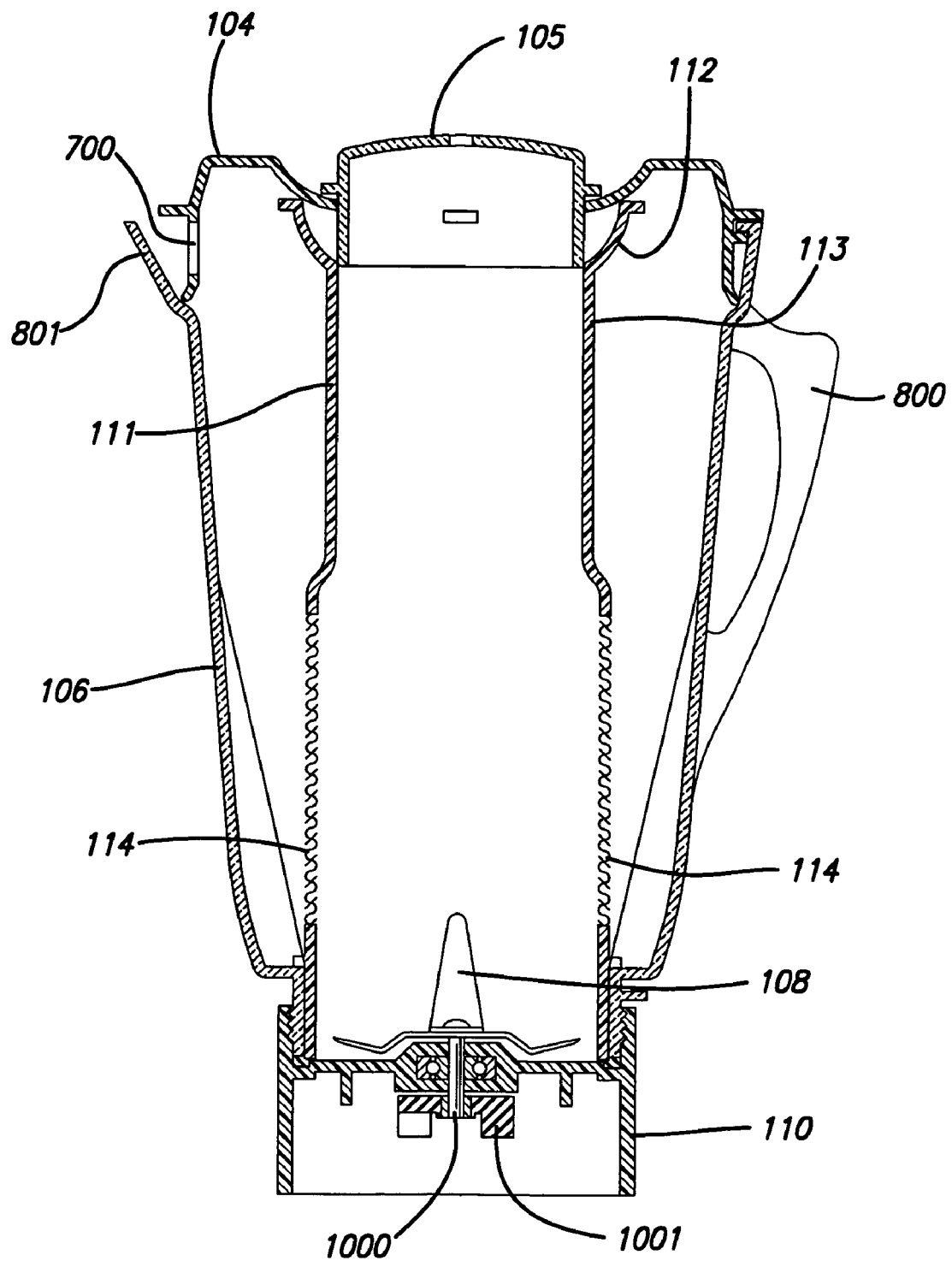
FIG. 10 is a cross-sectional view taken along section line 10-10 of FIG. 7.
Figure 11:
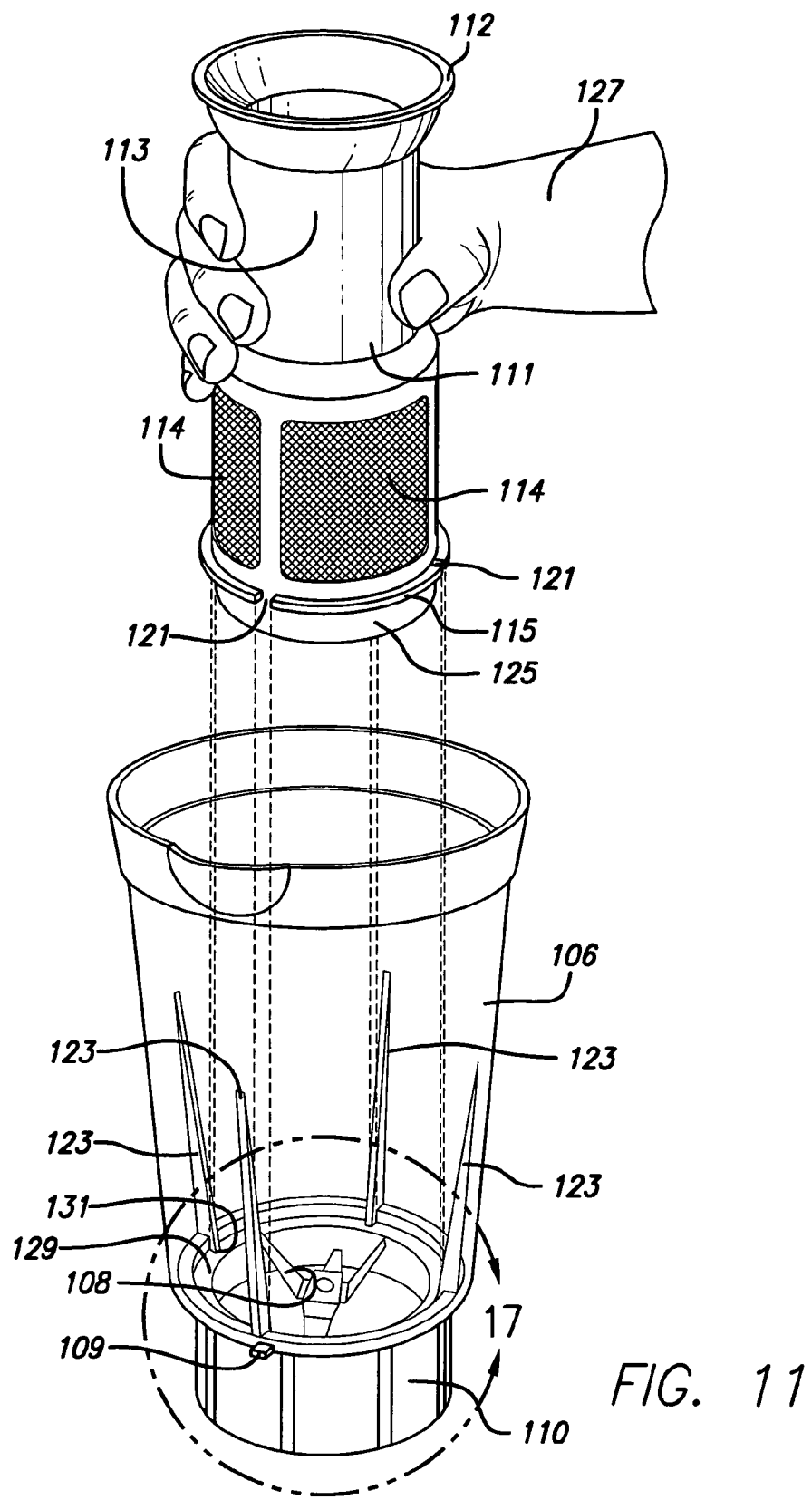
FIG. 11 is a perspective view of another exemplary embodiment of the present invention.
Figures 12, 13:
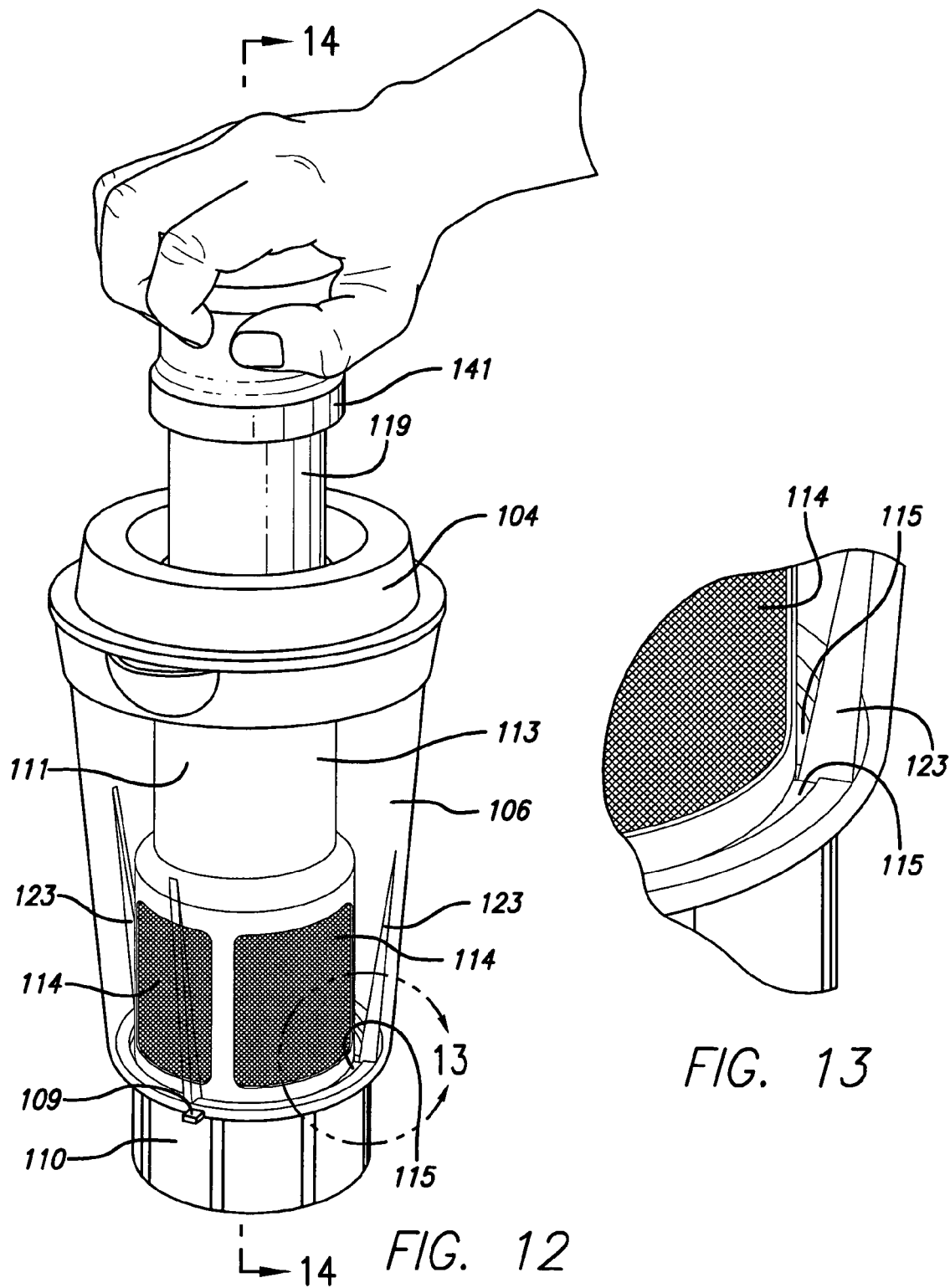
FIG. 12 is a perspective view of yet another exemplary embodiment of the present invention.
FIG. 13 is an enlarged detailed view taken along directional arc 13 of FIG. 12.
Figure 14:
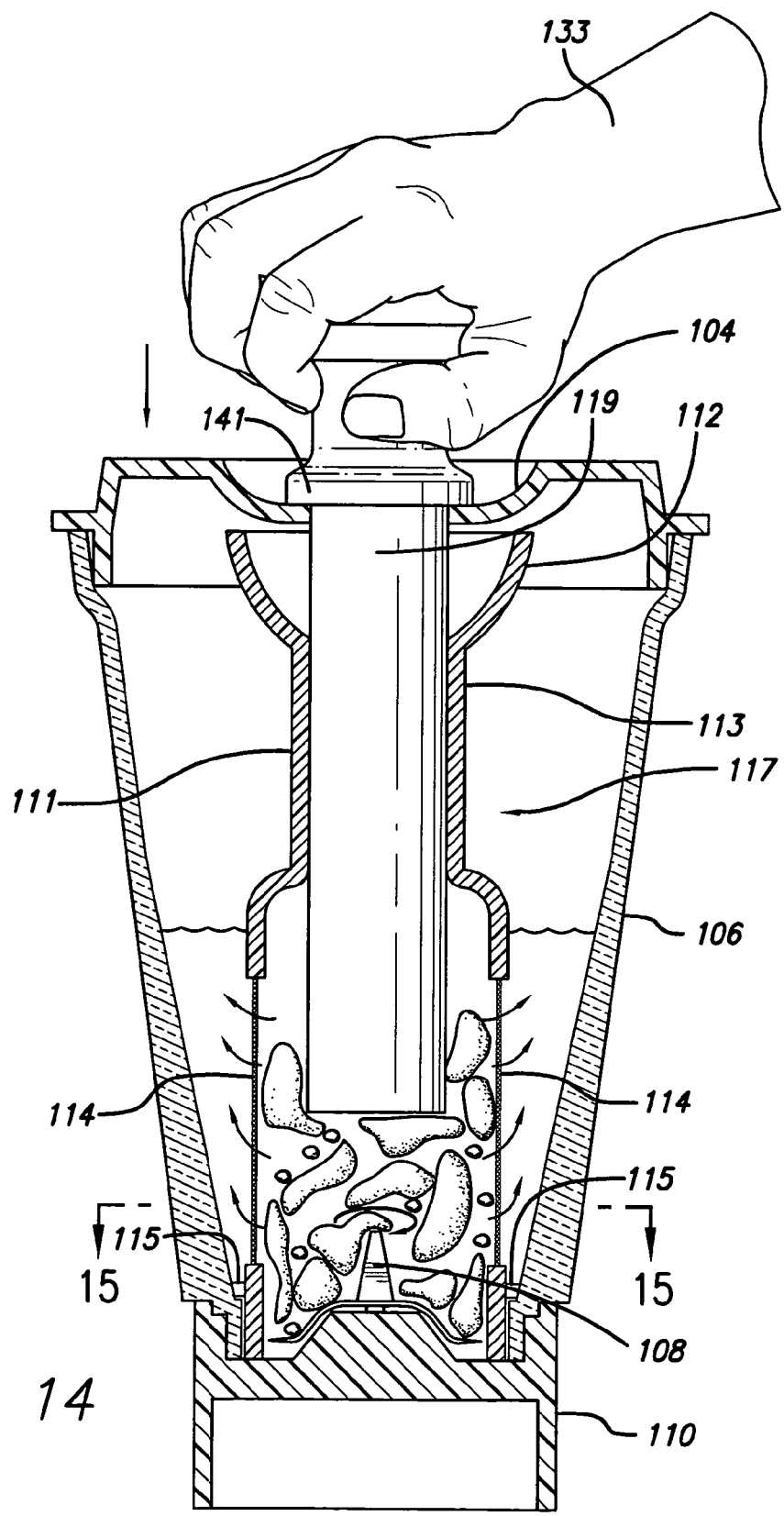
FIG. 14 is a cross-sectional view taken along section line 14-14 of FIG. 12.
Figure 15:
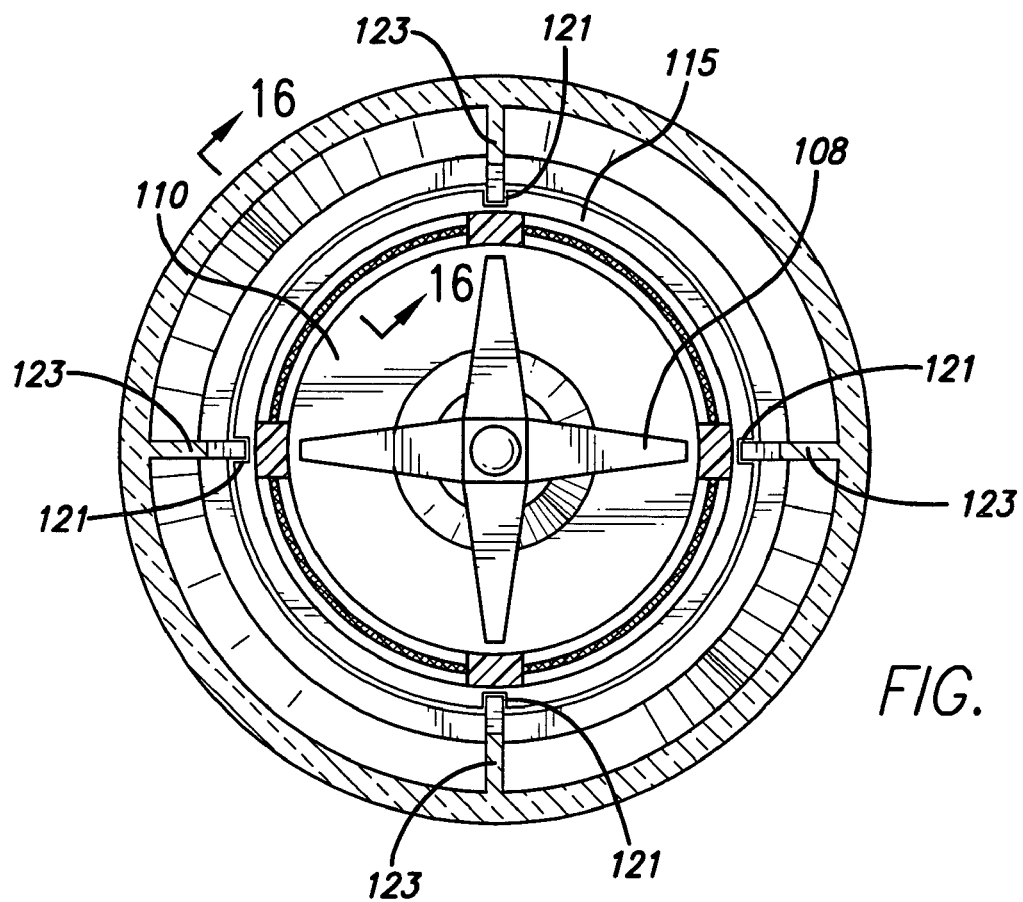
FIG. 15 is a cross-sectional view taken along section line 15-15 of FIG. 14.

Blender container 106 may be equipped with a removable juicer 117 (FIG. 14) comprising hollow juicer member 111 and a generally elongated plunger 119 adapted for insertion into juicer member 111 via removable (and partially open) lid member 104, as generally illustrated in FIGS. 12 and 14. Juicer member 111 has a generally circular cross-section which varies somewhat in diameter from top to bottom, as generally shown in FIGS. 1, 7, 10-12, 14. Plunger 119 (FIGS. 12, 14) may be configured as a solid body. Alternatively, plunger 119 may be of a partially hollow configuration, such as being closed at the bottom and open at the top. This type of plunger configuration may be appropriate for measuring foodstuffs and the like. Other suitable plunger configurations may be utilized, if necessary.

Juicer member 111 includes a generally tubular body 113 of variable diameter being equipped at one end with a multi-panel sieve-like filter 114 and a funnel 112 at an opposite end, as generally depicted in FIG. 11. Tubular body 113 includes a base portion 125 (FIG. 11) disposed downstream from filter 114. Base portion 125 is provided with a generally annular outer lip 115 (FIG. 11) which includes a plurality of indentations 121 adapted to removably engage a corresponding set of generally elongated ridges 123 integrally formed on the interior of blender container 106, as generally illustrated in FIG. 11.

Figure 16:
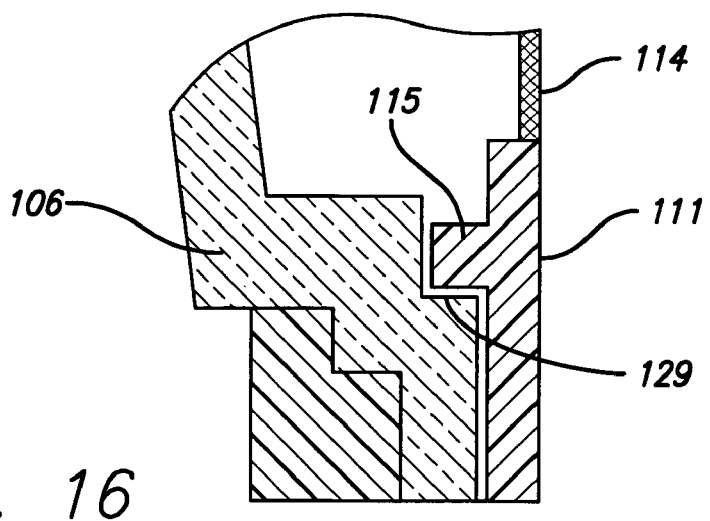
FIG. 16 is a cross-sectional view taken along section line 16-16 of FIG. 15.
Figure 17:
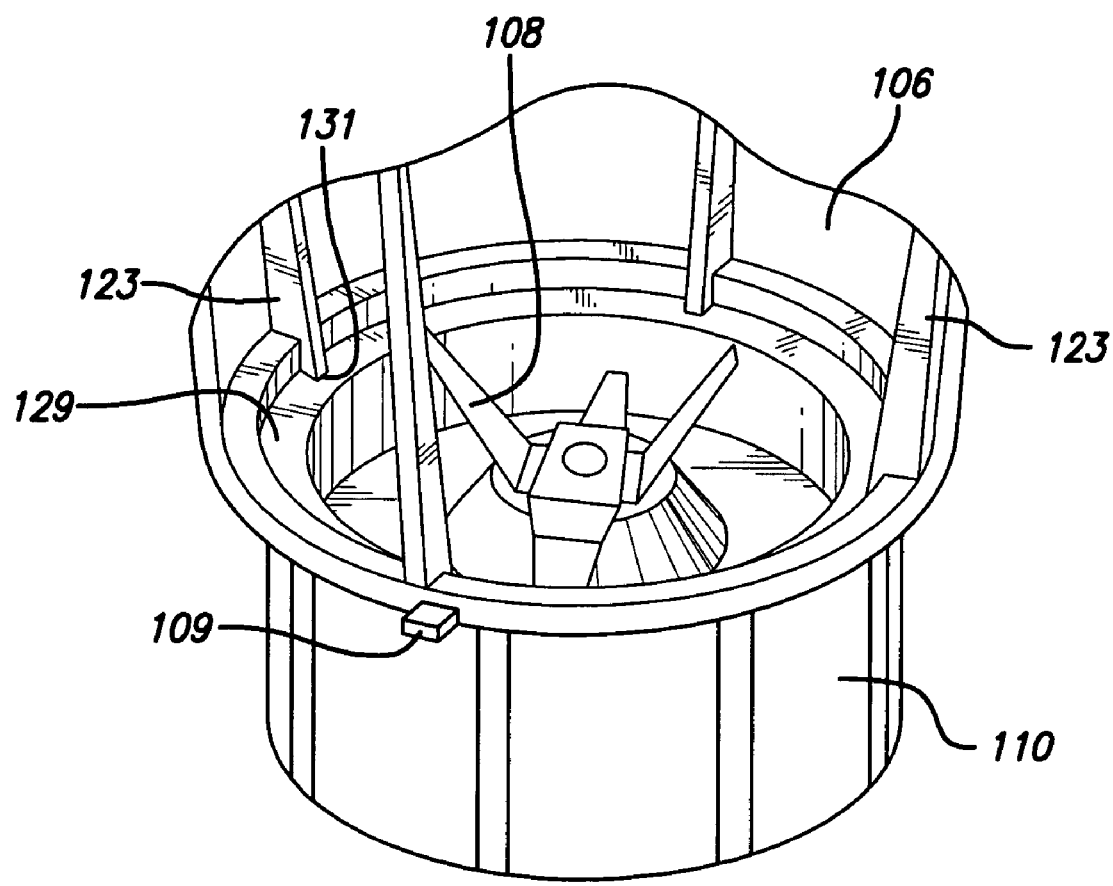
FIG. 17 is an enlarged detailed view taken along directional arc 17 of FIG. 11.

Each one of ridges 123 has a generally triangular cross-section which flares toward removable base portion 110 (FIG. 11). Each indentation 121 is configured to engage somewhat loosely a respective ridge 123 as juicer member 111 is being inserted into blender container 106 by a user 127 (FIG. 11). To prevent over-insertion of juicer member 111, blender container 106 is provided with an inwardly protruding internal step 129 (FIGS. 11, 16-17) adapted to stop the advance of outer lip 115 (FIG. 16). Internal step 129 extends under and away from base portions 131 of ridges 123 into the interior of blender container 106 allowing outer lip 115 to securely rest on top of it, as generally depicted in FIGS. 11, 16-17.

The user inserts juicer member 111 with indentations 121 being generally lined up with respective ridges 123 to ensure proper operation of juicer 117, as generally illustrated in FIG. 11. Blade member 108 is operatively disposed within base portion 125 and filter 114 (of juicer member 111) when juicer member 111 is supported by internal step 129 and removable base portion 110 is affixed to blender container 106. Indentations 121 may be adapted to afford a certain degree of lateral movement of outer lip 115 of juicer member 111 within blender container 106 (i.e., generally toward/away from respective ridges 123) when juicer member 111 is supported by internal step 129.

Multi-panel sieve-like filter 114 may be made of wire mesh screen material or the like. Filter 114 generally conforms to the shape of tubular body 113, as generally shown in FIGS. 1, 7, 11-12. Filter 114 is adapted to strain juice being generated (within hollow juicer member 11) by a user 133 pushing fruit and/or vegetable fragments generally downward (toward base portion 110) via plunger 119 when blade member 108 is operative, as generally illustrated in FIG. 14.

The opening provided by removable lid member 104 is adapted to accommodate plunger 119, as generally shown in FIG. 12. Plunger 119 includes a top exterior lip 141 (FIGS. 12, 14) which is adapted to contact the interior of funnel 112 (FIG. 14) and prevent plunger 119 from advancing further into tubular body 113 during the juice extraction operation. Top exterior lip 141 defines the optimal range of plunger insertion into tubular body 113. Plunger 119 and rotating blade member 108 force the generated juice to flow from the interior of tubular body 113 into the interior of blender container 106 (FIG. 14), where it is collected for consumption by user 133. The blender motor transmits a rotational force to blade member 108 via motor shaft 1000 and mating impeller 1001, as generally depicted in FIG. 10.

The remaining pulp is separated and trapped within the interior of juicer member 111. A person skilled in the art would readily recognize that by providing a two-part cap such as implemented by lid members 104, 105 of FIG. 1, users can access the contents of juicer member 111 without removing the entire cap or interrupting the operation of the blender for fear of spillage or splattering. For example, the user may remove lid member 105 to add more food fragments to juicer member 111 for juice extraction.

Figures 7, 8, 9:
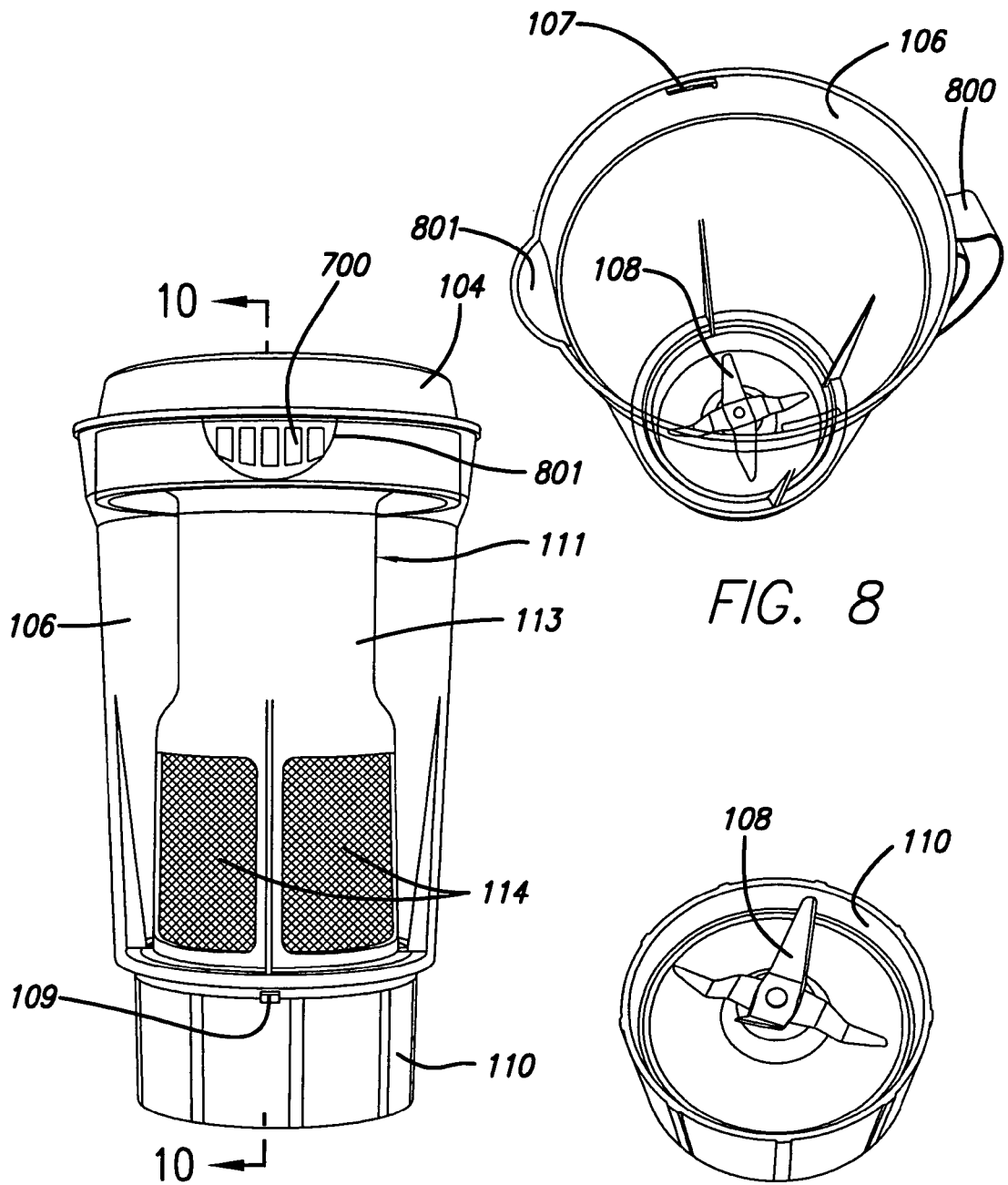
FIG. 7 is a perspective view of a blender container equipped with a removable juicer member for use as part of the blender and juicer system of FIG. 1.
FIG. 8 is a top perspective view of the blender container of FIG. 7.
FIG. 9 is a top perspective view of a removable base for the blender container of FIG. 7.

Lid member 104 may be provided with a plurality of slots 700 (FIG. 7) to decant the contents of blender container 106 while lid member 104 remains affixed to the top of blender container 106. Blender container 106 may include a handle 800 and a spout 801 that facilitates decanting of the contents of blender container 106, as generally depicted in FIG. 8. Lid member 104 is affixed to the top of blender container 106 with slots 700 being disposed generally behind spout 801 to allow decanting of extracted juice, as generally shown in FIG. 7. Once all the extracted juice has been decanted from the fruit and/or vegetable fragments, user 133 may remove plunger 119, lid member 104, juicer member 111 and base portion 110 from blender container 106 for cleaning.

Other components and/or configurations may be utilized, provided such other components and/or configurations remain within the intended scope of the present invention. A person skilled in the art would appreciate that exemplary embodiments described hereinabove are merely illustrative of the general principles of the present invention. Other modifications or variations may be employed that are within the scope of the invention. Thus, by way of example, but not of limitation, alternative configurations may be utilized in accordance with the teachings herein. Accordingly, the drawings and description are illustrative and not meant to be a limitation thereof.

Moreover, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Thus, it is intended that the invention cover all embodiments and variations thereof as long as such embodiments and variations come within the scope of the appended claims and their equivalents.

What is claimed is:

1. A blender and juicer system, comprising:
   a first blender container with an open top and an open bottom;
   a removable juicer member being hollow and having a top end and a bottom end as well as being open at each end and adapted for insertion into said blender container, said blender container being configured to prevent the over-insertion of said removable juicer member, said inserted juicer member configured to engage operatively the interior of said blender container;
   a plunger adapted for insertion into said removable juicer member, said inserted plunger being utilized during a juice extraction operation;
   means for defining the optimal range of plunger insertion into said removable juicer member;
   a blender base;
   a second blender container with an open top and a closed bottom, said second blender container being operatively coupled to said blender base; and
   a set of elongated ridges being integrally formed on the interior of said first blender container,
   wherein said removable juicer member is provided at one end with an outer lip,
   wherein said removable juicer member is provided at another end with a funnel, the funnel having a convex curvature,
   wherein said outer lip includes a plurality of indentations configured to removably engage said set of elongated ridges,
   wherein said removable juicer member is further provided with a filter between said outer lip and said funnel,
   wherein said filter has a multi-panel sieve-like configuration,
   wherein said removable juicer member includes a substantially tubular body of variable diameter,
   wherein said multi-panel sieve-like filter substantially conforms to the shape of said tubular body,
   wherein said removable juicer member is configured to trap internally pulp remaining after a juice extraction operation,
   wherein the open top of said second blender container is configured to receive a cap,
   wherein said cap is affixed to the open top of said second blender container via a fit selected from a group consisting of a friction fit, a snap fit, and a thread fit, wherein said cap is operatively affixed to open top of said second blender container, wherein said received cap is removable, wherein said second blender container is configured for storage of blended contents, wherein said closed second blender container is configured to rest on said cap when not being used in conjunction with said blender base, wherein said second blender container is provided with external ridges spaced symmetrically from each other, wherein said second blender container utilizes said external ridges to stand upright on a substantially flat surface, wherein the upright disposition of said second blender container allows users unimpeded access to its interior, wherein each of said symmetrically spaced external ridges includes at least one arcuate portion, and wherein said arcuate portions are configured to prevent said second blender container from tipping over when standing upright.

* * * * *